US012600321B2

(12) United States Patent
Nakashima

(10) Patent No.: US 12,600,321 B2
(45) Date of Patent: Apr. 14, 2026

(54) DEFROSTER INTERIOR STRUCTURE

(71) Applicant: HONDA MOTOR CO., LTD., Tokyo (JP)

(72) Inventor: Yu Nakashima, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 352 days.

(21) Appl. No.: 18/540,967

(22) Filed: Dec. 15, 2023

(65) Prior Publication Data

US 2024/0217483 A1 Jul. 4, 2024

(30) Foreign Application Priority Data

Dec. 28, 2022 (JP) ................................. 2022-211865

(51) Int. Cl.
| | |
|---|---|
| *B62D 25/14* | (2006.01) |
| *B60H 1/24* | (2006.01) |
| *B60S 1/02* | (2006.01) |
| *B60S 1/54* | (2006.01) |

(52) U.S. Cl.
CPC .............. *B60S 1/023* (2013.01); *B60H 1/242* (2013.01); *B60H 1/243* (2013.01); *B60S 1/54* (2013.01); *B62D 25/142* (2013.01)

(58) Field of Classification Search
CPC ........ B60H 1/242; B60H 1/24; B60H 1/3407; B60H 1/0055; B60H 1/00564; B62D 25/142; B60S 1/023; B60S 1/54
USPC ...................................... 296/70, 72, 74, 208
See application file for complete search history.

(56) References Cited

U.S. PATENT DOCUMENTS

| | | | | | |
|---|---|---|---|---|---|
| 4,173,174 | A | * | 11/1979 | Vinko | ..................... B60H 1/247 |
| | | | | | 454/124 |
| 4,365,826 | A | * | 12/1982 | Iriyama | ................ B62D 25/145 |
| | | | | | 180/90 |
| 4,766,805 | A | * | 8/1988 | Sato | .......................... B60S 1/54 |
| | | | | | 454/127 |
| 7,044,537 | B2 | * | 5/2006 | Schoemann | ........... B60H 1/244 |
| | | | | | 296/146.7 |
| 2005/0067140 | A1 | * | 3/2005 | Sogame | ............. B60H 1/00407 |
| | | | | | 165/69 |
| 2010/0035533 | A1 | * | 2/2010 | Dubief | ................. B60H 1/0055 |
| | | | | | 454/127 |

(Continued)

FOREIGN PATENT DOCUMENTS

| | | | | | |
|---|---|---|---|---|---|
| DE | 102012008993 A1 | * | 11/2013 | ......... | B60H 1/00564 |
| DE | 102023002190 A1 | * | 7/2023 | ........... | B60H 1/3414 |

(Continued)

OTHER PUBLICATIONS

Japanese Office Action for Japanese Patent Application No. 2022-211865 mailed Apr. 2, 2024.

*Primary Examiner* — Gregory A Blankenship
(74) *Attorney, Agent, or Firm* — Amin, Turocy & Watson, LLP

(57) ABSTRACT

A defroster interior structure includes a defroster outlet blowing out air toward a side glass provided on a door of a vehicle. The door includes the side glass and a door panel provided below the side glass. The defroster outlet is disposed at a position where a side surface of an instrument panel and the door panel overlap each other in a vehicle width direction. The side surface and the door panel form a gap through which an airflow blown out from the defroster outlet flows toward the side glass.

8 Claims, 6 Drawing Sheets

(56)                    References Cited

U.S. PATENT DOCUMENTS

| | | | |
|---|---|---|---|
| 2010/0178861 A1* | 7/2010 | Sano | B60H 1/00028 |
| | | | 454/127 |
| 2019/0176761 A1* | 6/2019 | Doi | B60R 13/025 |
| 2020/0070727 A1* | 3/2020 | Sawada | B60R 1/002 |
| 2020/0171911 A1* | 6/2020 | Sawada | B60H 1/3421 |
| 2020/0247217 A1* | 8/2020 | Doi | B60H 1/243 |
| 2024/0217483 A1* | 7/2024 | Nakashima | B60S 1/023 |

FOREIGN PATENT DOCUMENTS

| | | |
|---|---|---|
| JP | 2018-090146 | 6/2018 |
| WO | 2020/066450 | 4/2020 |

* cited by examiner

DEFROSTER INTERIOR STRUCTURE

CROSS-REFERENCE TO RELATED APPLICATION

The application is based on Japanese Patent Application No. 2022-211865 filed on Dec. 28, 2022, the content of which is incorporated herein by reference.

BACKGROUND OF THE INVENTION

Field of the Invention

The present invention relates to a defroster interior structure for removing water vapor and frost adhering to a side glass.

Description of Related Art

For vehicles, there is a known method of removing water vapor and frost adhering to a side glass by providing an outlet of the side defroster on the side surface of an instrument panel and blowing out air from the defroster outlet toward the side glass (see, for example, Japanese Unexamined Patent Application, First Publication No. 2018-90146 (hereinafter referred to as Patent Document 1)).

A defroster structure including the defroster outlet disclosed in Patent Document 1 includes a duct that conveys air blown out toward the side glass of a vehicle, and a dashboard in which an opening is formed at a position corresponding to a region excluding a portion of the rear side of the vehicle at the outlet between the outlet from which air in the duct is blown out and the side glass. Thereby, with a simple structure, it is possible to make it difficult for an airflow for preventing fogging of the side glass to be made to hit an occupant.

SUMMARY OF THE INVENTION

However, the defroster structure disclosed in Patent Document 1 has a problem in that the defroster outlet is visible to an occupant, resulting in poor aesthetic appearance. For this reason, there has been a need for a defroster interior structure that can improve aesthetic appearance of the vehicle without obstructing an airflow blown out from the defroster outlet toward the side glass.

An aspect of the present invention has been made in view of the above-described problem, and an object thereof is to provide a defroster interior structure that can improve aesthetic appearance by providing an outlet at a position invisible to an occupant and can allow a blown-out airflow to reach a side glass without obstruction.

In order to solve the above-problem and achieve the object, the present invention adopts the following aspects.

(1) A defroster interior structure according to one aspect of the present invention is a defroster interior structure including a defroster outlet blowing out air toward a side glass provided on a door of a vehicle, in which the door includes the side glass and a door panel provided below the side glass, the defroster outlet is disposed at a position where a side surface of an instrument panel and the door panel overlap each other in a vehicle width direction, and the side surface and the door panel form a gap through which an airflow blown out from the defroster outlet flows toward the side glass.

According to the above-described aspect, an airflow blown out from the defroster outlet disposed on the side surface of the instrument panel flows through the gap formed between the side surface and the door panel and is blown out onto the side glass. At this time, the defroster outlet is covered in the vehicle width direction by the door panel and is disposed to be hidden when viewed from an occupant. For this reason, the defroster outlet is provided at a position that is not visible to the occupant, and thus aesthetic appearance is improved and the design quality can be improved. The gap is formed between the side surface of the instrument panel and the door panel, and thus an airflow blown out from the defroster outlet can reach the side glass without obstruction.

(2) In the above-described aspect (1), at least one of the instrument panel and the door panel may have a concave shape that is curved away from the other, and a gap may be formed between the concave shape and the other.

In this case, since the gap is formed in a concave shape, a gap between the side surface of the instrument panel and the door panel can be made smaller than in a case where the gap is formed uniformly, thereby improving aesthetic appearance. In this case, since the gap is formed in a concave shape, an airflow blown out from the defroster outlet can be given directionality, and the airflow can be reliably blown to a desired position on the side glass. Thus, when this configuration is adopted, anti-fogging performance of the side glass can be further improved.

(3) In the above-described aspect (1) or (2), the defroster outlet may be disposed closer to a front of a vehicle than a vehicle front end of the side glass and may blow out an airflow toward the vehicle front end.

In this case, the airflow blown out from the defroster outlet can be directed rearward from the vehicle front end of the side glass. For this reason, when this configuration is adopted, it is possible to make an airflow uniformly hit the entire side glass and to prevent uneven fogging from occurring.

(4) In the above-described aspect (1), an upper end of the door panel may include a curved portion that is curved toward the side glass from the gap.

In this case, an airflow flows along a curved surface of the curved portion at the upper end of the door panel due to the Coanda effect, and thus the airflow can be made to hit the lower end of the side glass. Thus, when this configuration is adopted, the airflow can be made to hit the entire side glass.

(5) In the above-described aspect (1) or (4), the side surface of the instrument panel may include an upper-lower surface extending upward from the defroster outlet, and a bulging portion that bulges outward in the vehicle width direction from an upper end of the upper-lower surface.

In this case, a flow path through which an airflow blown out from the defroster outlet is directed toward a lower end of the side glass is formed between the bulging portion of the instrument panel and the upper end of the door panel. For this reason, when this configuration is adopted, an airflow can be made to hit the lower side of the side glass by the bulging portion, and thus an airflow can be made to hit the entire surface of the side glass.

(6) In the above-described aspect (5), interior members may be provided at both ends of the instrument panel in the vehicle width direction, the interior members being disposed to protrude above the instrument panel and to be inclined outward in the vehicle width direction and toward a rear of the vehicle, and the bulging portion may be the interior member.

In this case, the above-mentioned bulging portion can also be replaced with a separate interior member, and then there is no need to form the bulging portion in the instrument panel, thereby improving aesthetic appearance.

(7) In the above-described aspect (6), the interior member may include a digital mirror monitor.

In this case, it is possible to prevent an airflow blown out from the defroster outlet from flowing to an occupant side while hitting the entire surface of the side glass while the digital mirror monitor is disposed at an easy-to-see position above the instrument panel. For this reason, when this configuration is adopted, it is possible to improve defrosting performance while maintaining visibility for the occupant and to reduce the occupant's discomfort.

(8) In the above-described aspect (6), at least a portion of the gap may extend further forward in the vehicle than the interior member.

In this case, an airflow leaking out of the gap toward the front of the vehicle from the bulging portion can be directed toward a window on a back surface of the bulging portion. For this reason, when this configuration is adopted, an airflow is more likely to be directed toward the window, and the airflow can be prevented from being blown toward an occupant, thereby making it possible to reduce the occupant's discomfort.

According to the aspect of the present invention, it is possible to improve aesthetic appearance by providing an outlet at a position invisible to an occupant and to allow a blown-out airflow to reach a side glass without obstruction.

DETAILED DESCRIPTION OF THE INVENTION

Figure 1:
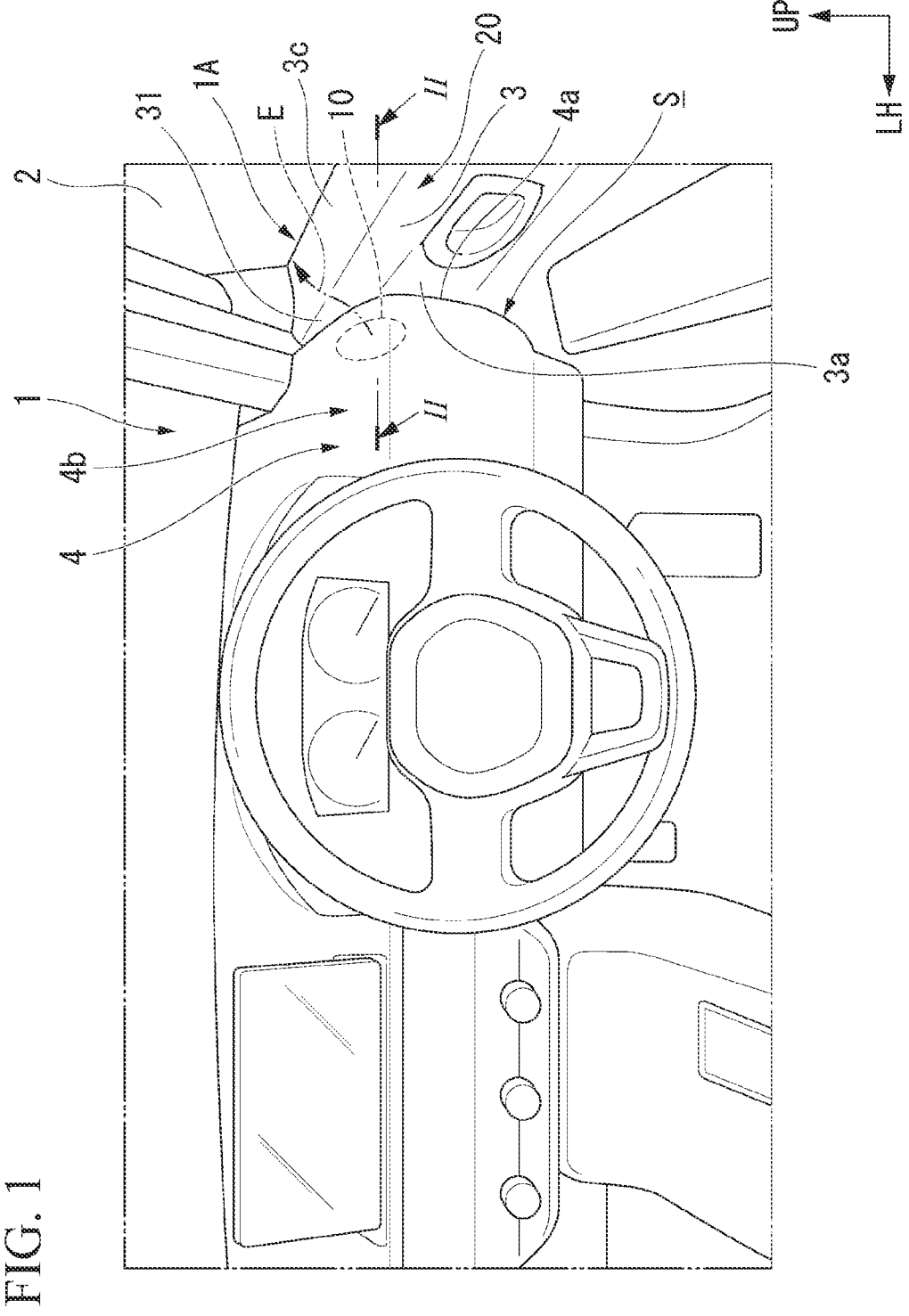
FIG. 1 is a diagram of a front portion in a vehicle interior of a vehicle according to a first embodiment when viewed diagonally from the rear and above.

Embodiments of the present invention will be described below based on the drawings. In the embodiments described below, common parts are denoted by the same reference numerals.

In the following description, unless otherwise specified, terms such as front and rear, top and bottom, and left and right refer to the front and rear, top and bottom, and left and right of a vehicle facing in a forward direction. An arrow UP pointing upward in the vehicle, an arrow FR pointing forward in the vehicle, and an arrow LH pointing leftward in the vehicle are denoted at appropriate locations in the drawings.

First Embodiment

FIG. 1 is a diagram of a front portion in a vehicle interior of a vehicle 1 according to the present embodiment when viewed diagonally from the rear and above.

Figure 2:
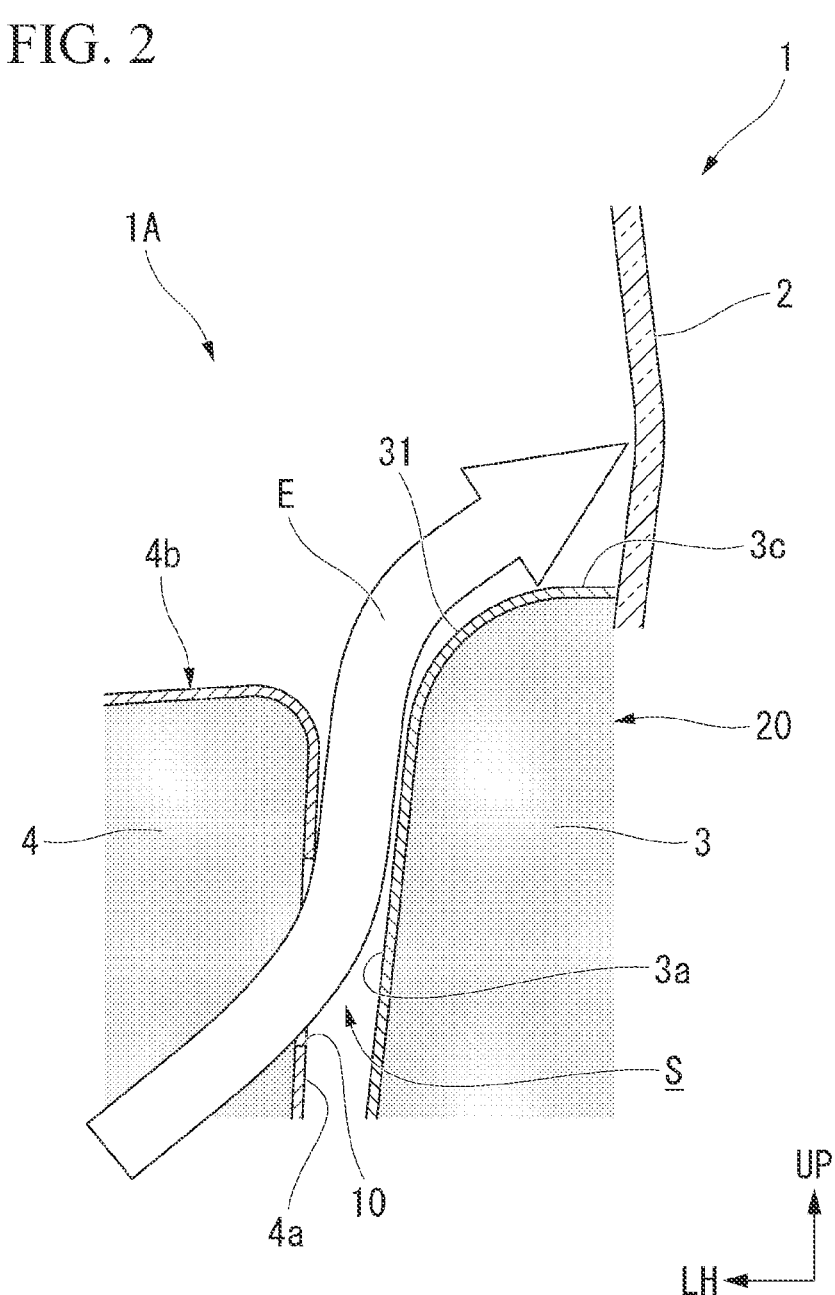
FIG. 2 is a cross-sectional view taken along line II-II in FIG. 1 and is a diagram illustrating a flow of air blown out from a defroster outlet.
Figure 3:
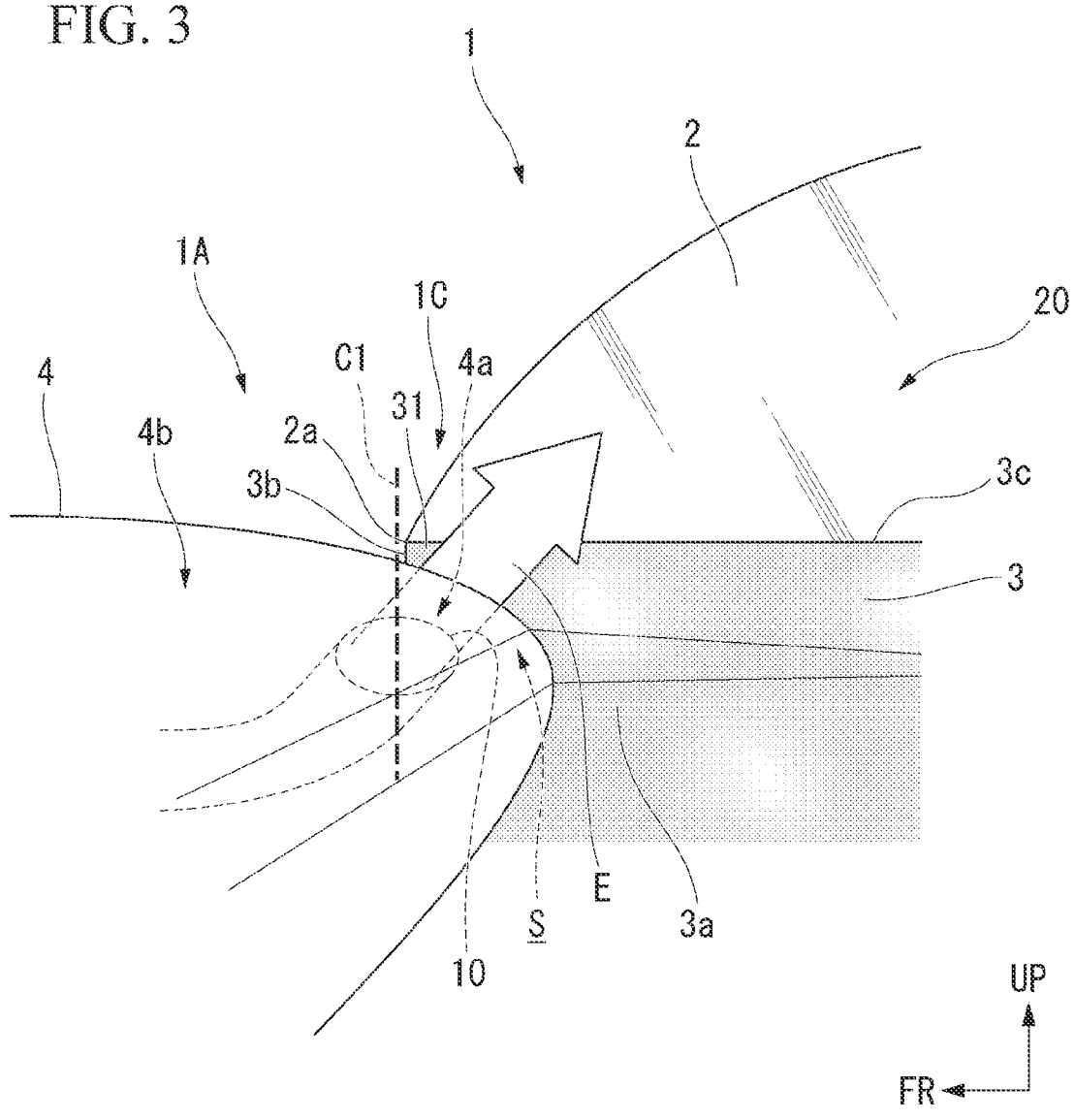
FIG. 3 is a side view of a door viewed from the vehicle interior and is a diagram illustrating a positional relationship between the defroster outlet and a side glass.

FIG. 2 is a cross-sectional view taken along line II-II in FIG. 1 and is a diagram illustrating a flow of air E blown out from a defroster outlet 10. FIG. 3 is a side view of a door 20 viewed from the vehicle interior and is a diagram illustrating a positional relationship between the defroster outlet 10 and a side glass 2.

In FIG. 1, reference numeral 20 denotes a door of the vehicle 1, reference numeral 2 denotes a side glass provided on the door 20 of the vehicle 1, and reference numeral 3 denotes a door panel provided below the side glass 2 of the door 20.

Reference numeral 4 denotes an instrument panel that is disposed facing the front of a front seat.

In the vehicle 1 according to the present embodiment, a driver's seat is disposed on the right side in a forward direction of the vehicle. A defroster interior structure TA of the vehicle 1 includes the defroster outlet 10 from which air E is blown out toward the side glass 2.

As illustrated in FIGS. 1 to 3, the side glass 2 is disposed at substantially the center of the door panel 3 in a vehicle width direction. A side surface 4a of the instrument panel 4 overlaps a vehicle front portion 3b of the door panel 3 when the door 20 is closed.

An upper end 3c of the door panel 3 is located higher than an upper surface 4b of the instrument panel 4. The upper end 3c of the door panel 3 includes a curved portion 31 that is curved toward the side glass 2 from an inner side surface 3a (gap S to be described later) on the inner side in the vehicle width direction when viewed from the rear in the vehicle interior. Here, the curved portion 31 is curved with such a curvature that the air E is not separated therefrom.

The defroster outlet 10 blows out the air E sent out from an air conditioning unit, which is not illustrated in the drawing, from the inside of the vehicle toward the side glass 2, and constitutes a portion of the defroster interior structure TA. The defroster outlet 10 is connected to the above-mentioned air conditioning unit through a connection duct (not illustrated). The air conditioning unit includes, for example, an indoor heat exchanger (an evaporator and a heater) and a blower which are not illustrated in the drawing. That is, the defroster outlet 10 blows conditioned air blown out from the blower of the air conditioning unit to the outside of the instrument panel 4 through the connection duct.

The defroster outlet 10 is provided on each of right and left side surfaces 4a of the instrument panel 4. The defroster outlet 10 can be formed into an appropriate shape, such as a circular shape, an elliptical shape, or a rectangular shape.

The defroster outlet 10 is disposed at a position on the side surface 4a which is close to the rear of the vehicle and at a position where the side surface 4a of the instrument panel 4 and the door panel 3 overlap each other in the vehicle width direction. At least a portion of the defroster outlet 10 is disposed closer to the front side of the vehicle than a vehicle front end 2a of the side glass 2 and blows out airflow (air E) toward the vehicle front end 2a of the side glass 2. Specifically, a center C1 of the defroster outlet 10 in the front-rear direction substantially matches the position of the vehicle front end 2a of the side glass 2 in the front-rear direction in FIG. 3. In other words, a vehicle front half of the defroster outlet 10 is positioned close to the front side than the vehicle front end 2a of the side glass 2, and a vehicle rear half of the defroster outlet 10 faces the door panel 3 in the vehicle width direction. It is preferable that the defroster outlet 10 be disposed on the side surface 4a of the instrument panel 4 at a height close to the upper surface 4b of the instrument panel 4.

The side surface 4a of the instrument panel 4 and the door panel 3 form the gap S in the vehicle width direction through which an airflow (air E) blown out from the defroster outlet 10 flows toward the side glass 2. The gap S is formed to be gradually narrowed downward and is formed uniformly over the entire width in the front-rear direction of the vehicle. The airflow (air E) blown out from the defroster outlet 10 into the gap S flows upward through the gap S, and the airflow blown out from the gap S changes its direction toward the side glass 2 to flow along the curved portion 31 of the door panel 3 and reaches the lower side of the side glass 2.

Figure 4:
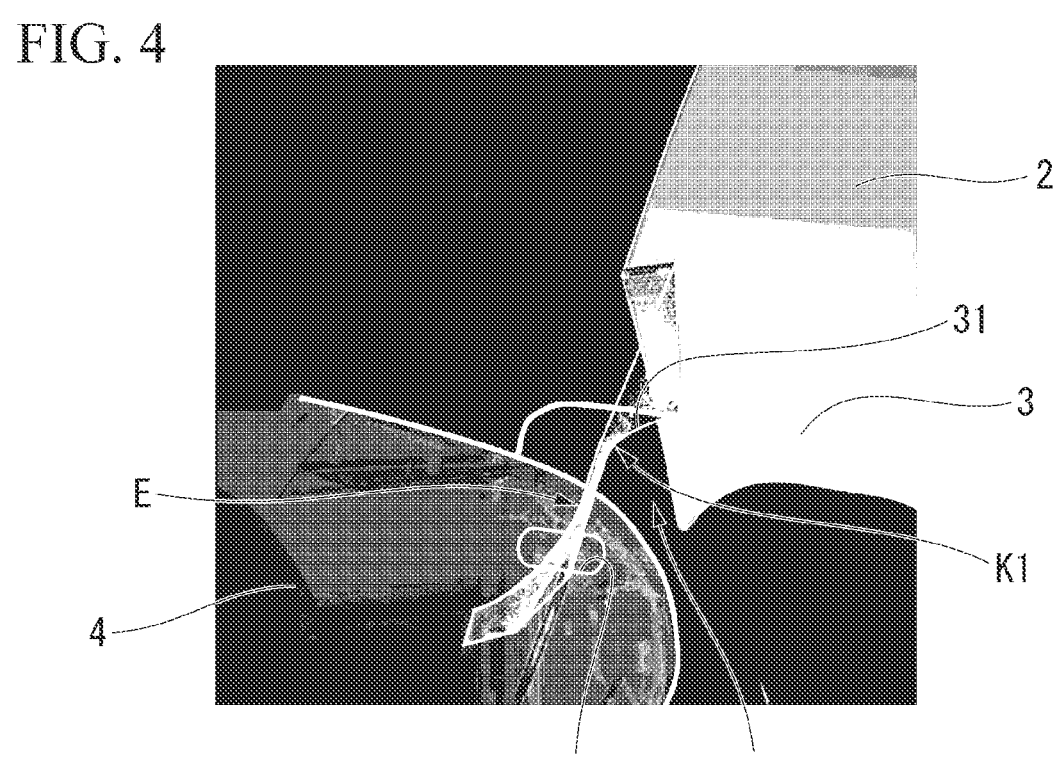
FIG. 4 is a diagram illustrating a distribution state of an airflow blown out from the defroster outlet in a defroster interior structure according to the first embodiment, and is a diagram corresponding to FIG. 2.

FIG. 4 is a diagram illustrating a distribution state of an airflow blown out from the defroster outlet 10 in the defroster interior structure 1A according to the embodiment, and is a diagram corresponding to FIG. 2. In FIG. 4, the airflow flows in a region indicated by a symbol K1 (region with a different color).

As illustrated in FIG. 4, the airflow (air E) blown out from the defroster outlet 10 passes through the gap S and reaches the lower side of the side glass 2 along the curved portion 31.

Figure 5:
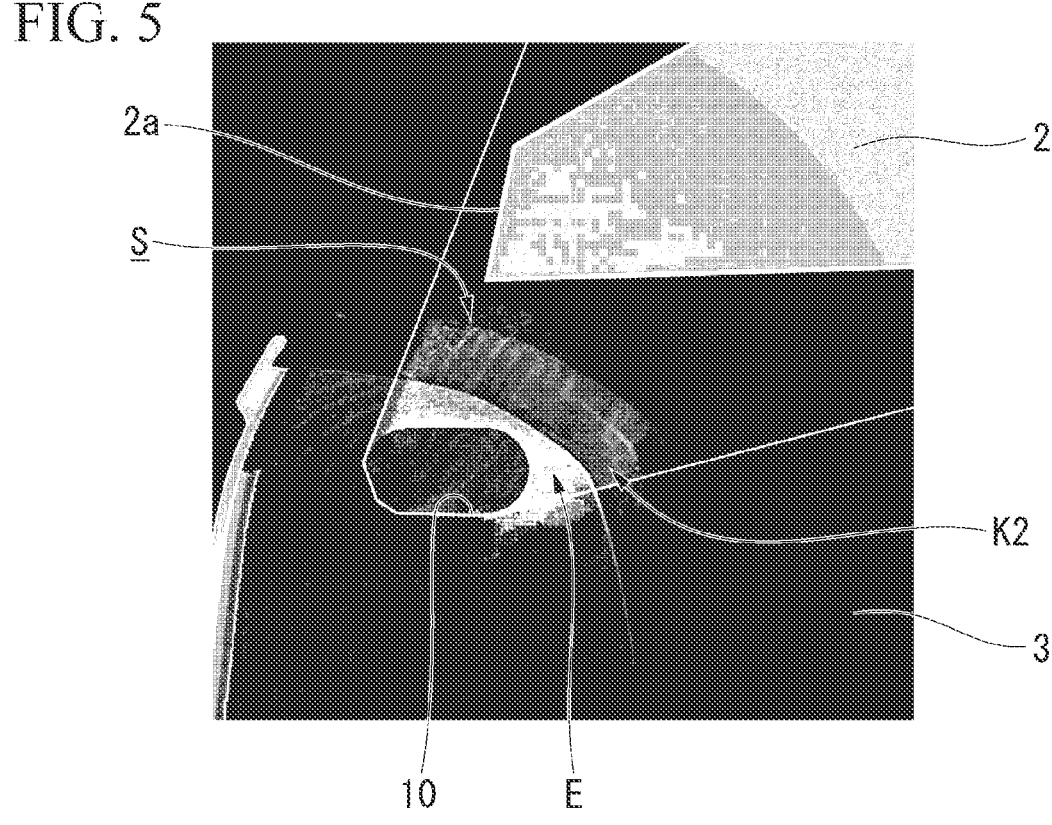
FIG. 5 is a diagram illustrating a distribution state of an airflow blown out from the defroster outlet in the defroster interior structure according to the first embodiment, and is a diagram corresponding to FIG. 3.

FIG. 5 is a diagram illustrating a distribution state of an airflow blown out from the defroster outlet 10 in the defroster interior structure 1A according to the embodiment, and is a diagram corresponding to FIG. 3. In FIG. 5, the airflow flows in a region indicated by a symbol K2 (region with a different color).

As illustrated in FIG. 5, the airflow (air E) blown out from the defroster outlet 10 is directed rearward from the vehicle front end 2a of the side glass 2.

Effects of First Embodiment

In the defroster interior structure 1A according to the present embodiment, an airflow (air E) blown out from the defroster outlet 10 disposed on the side surface 4a of the instrument panel 4 flows through the gap S formed between the side surface 4a and the door panel 3 and is blown out onto the side glass 2. At this time, the defroster outlet 10 is covered in the vehicle width direction by the door panel 3 and is disposed to be hidden when viewed from an occupant. For this reason, the defroster outlet 10 is provided at a position that is not visible to the occupant, and thus aesthetic appearance is improved and the design quality can be improved.

In the present embodiment, the gap S is formed between the side surface 4a of the instrument panel 4 and the door panel 3, and thus an airflow blown out from the defroster outlet 10 can reach the side glass 2 without obstruction.

In the defroster interior structure 1A according to the present embodiment, the defroster outlet 10 is disposed closer to the front side of the vehicle than the vehicle front end 2a of the side glass 2 and blows out an airflow (air E) toward the vehicle front end 2a. For this reason, the airflow blown out from the defroster outlet 10 can be directed rearward from the vehicle front end 2a of the side glass 2. Thus, when this configuration is adopted, it is possible to make an airflow uniformly hit the entire side glass 2 and to prevent uneven fogging from occurring.

In the defroster interior structure 1A according to the present embodiment, the upper end 3c of the door panel 3 includes the curved portion 31 that is curved toward the side glass 2 from the gap S. For this reason, an airflow (air E) flows along a curved surface of the curved portion 31 at the upper end 3c of the door panel 3 due to the Coanda effect, and thus the airflow can be made to hit the lower end of the side glass 2. Thus, when this configuration is adopted, the airflow can be made to hit the entire side glass 2.

Second Embodiment

Figure 6:
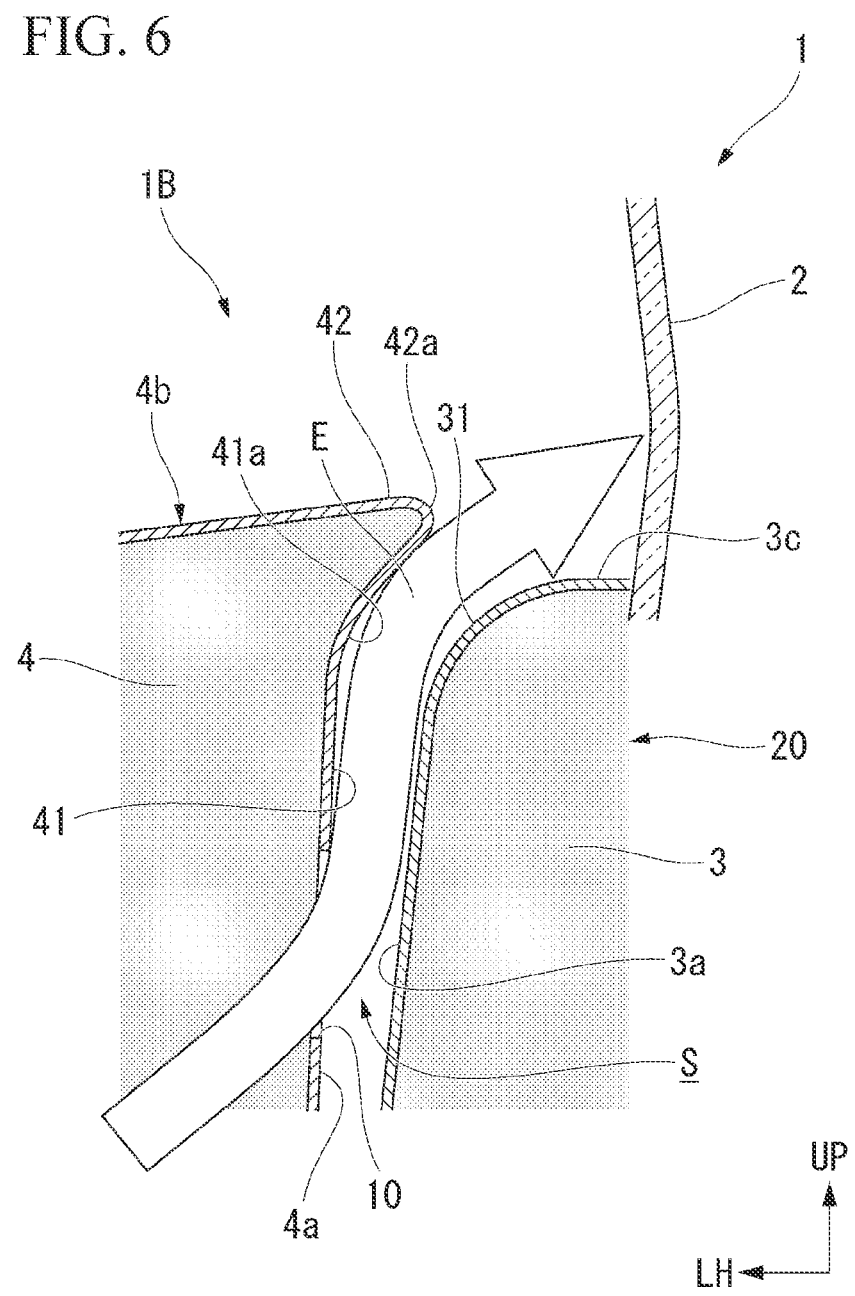
FIG. 6 is a cross-sectional view illustrating a flow of air blown out from a defroster outlet according to a second embodiment, and is a diagram corresponding to FIG. 2.

FIG. 6 is a cross-sectional view illustrating a flow of air E blown out from a defroster outlet 10 according to the present embodiment, and is a diagram corresponding to FIG. 2.

A defroster interior structure 1B according to the present embodiment has substantially the same basic configuration as that of the defroster interior structure 1A according to the first embodiment (see FIGS. 1 to 3), but the shape of a side surface 4a of an instrument panel 4 is different from that in the first embodiment. That is, the side surface 4a of the instrument panel 4 according to the present embodiment includes an upper-lower surface 41 that extends upward from the defroster outlet 10, and a bulging portion 42 that bulges outward in the vehicle width direction from an upper end of the upper-lower surface 41.

A door panel 3 of a door 20 according to the second embodiment includes a curved portion 31 in which an upper end 3c of the door panel 3 is curved toward a side glass 2 from an inner side surface 3a (gap S to be described later) on the inner side in the vehicle width direction when viewed from the rear in a vehicle interior, similar to the first embodiment. An upper surface 4b of the instrument panel 4 is positioned higher than the upper end 3c of the door panel 3. The bulging portion 42 is disposed at a position higher than the curved portion 31. A bulged tip 42a of the bulging portion 42 which faces the side glass 2 is positioned above the curved portion 31. A connection portion 41a connected to the bulging portion 42 of the upper-lower surface 41 is smoothly curved to have a curved surface that is substantially the same as the curved surface of the curved portion 31. That is, the gap S extends substantially in the vertical direction between the upper-lower surface 41 and the inner side surface 3a of the door panel 3 and is further curved outward in the vehicle width direction between the curved portion 31 and the bulging portion 42.

Effects of Second Embodiment

Since the defroster interior structure 1B according to the present embodiment has the same basic configuration as that in the first embodiment, it is possible to obtain the same effects as those in the first embodiment described above.

However, the defroster interior structure 1B including a defroster outlet 10 according to the present embodiment includes the upper-lower surface 41 and the bulging portion 42 in the instrument panel 4, and thus a flow path through which an airflow (air E) blown out from the defroster outlet 10 is directed toward a lower end of the side glass 2 is formed between the bulging portion 42 of the instrument panel 4 and the upper end 3c of the door panel 3. For this reason, when this configuration is adopted, an airflow can be made to hit the lower side of the side glass 2 by the bulging portion 42, and thus an airflow can be made to hit the entire surface of the side glass 2.

Third Embodiment

Figure 7:
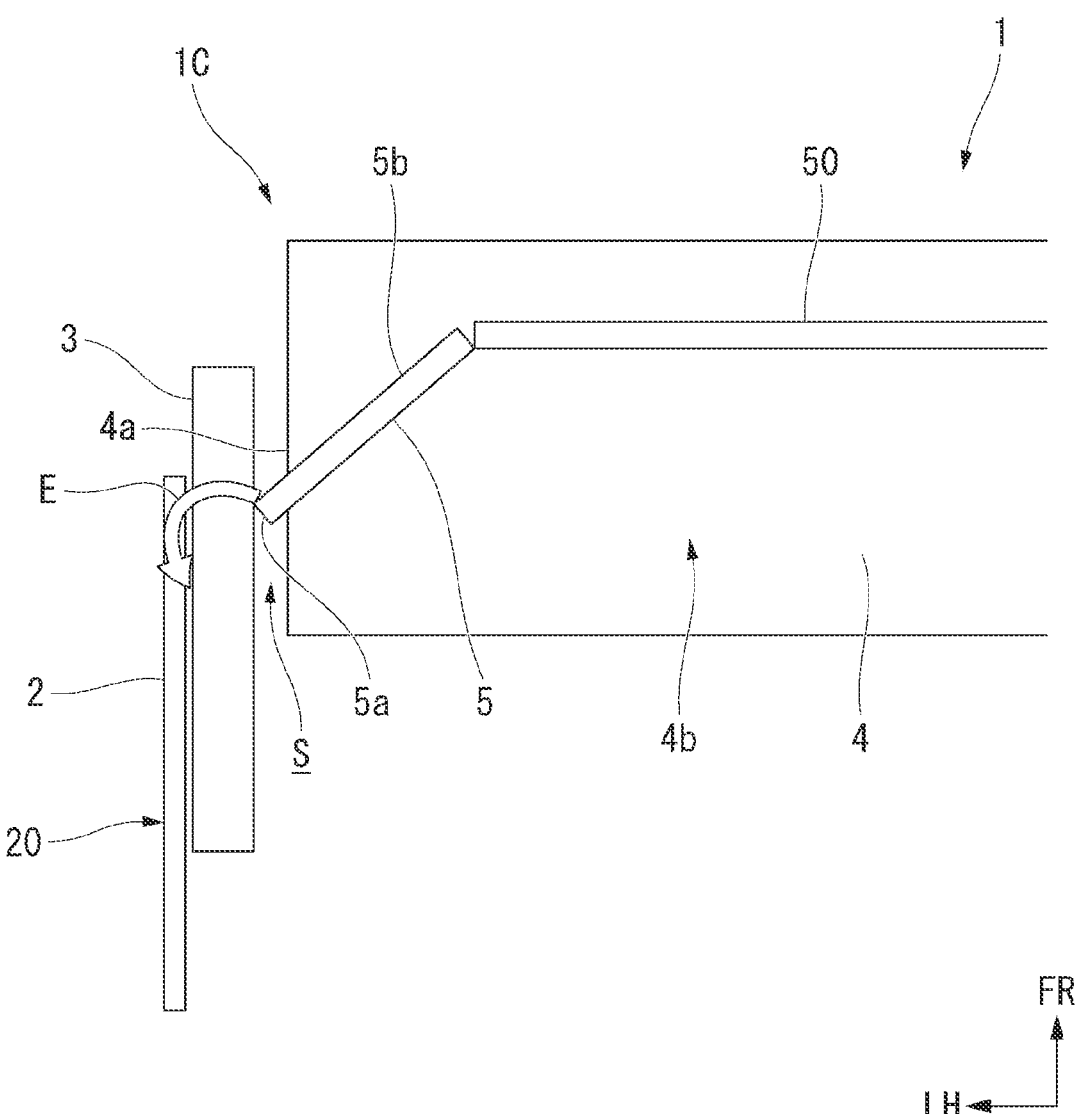
FIG. 7 is a diagram of a front portion in a vehicle interior of a vehicle according to a third embodiment when viewed from above.

FIG. 7 is a diagram of a front portion in a vehicle interior of a vehicle according to the present embodiment when viewed from above.

A defroster interior structure 1C according to the present embodiment has substantially the same basic configuration as that of the defroster interior structure 1B according to the second embodiment (see FIG. 6), but a configuration in which a digital mirror monitor 5 (interior member, bulging portion) is provided instead of the bulging portion 42 (see FIG. 6) provided on a side surface 4a of an instrument panel 4 is adopted. That is, the digital mirror monitors 5 are provided at both ends in the vehicle width direction of the instrument panel 4 according to the present embodiment so as to protrude above the instrument panel 4.

The digital mirror monitors 5 are disposed to be connected on both right and left sides of a front display 50 which is disposed in front of a driver's seat at the center in the vehicle width direction above the instrument panel 4, and are inclined toward both outer sides in the vehicle width direction and toward the rear of the vehicle. An outer end 5a of the digital mirror monitor 5 in the vehicle width direction protrudes while bulging out to a position where it overlaps the upper side of a gap S between the side surface 4a of the instrument panel 4 and a door panel 3 when viewed from above. At least a portion of the gap S extends more toward the front of the vehicle than the digital mirror monitor 5.

Effects of Third Embodiment

Since the defroster interior structure 1C according to the present embodiment has the same basic configuration as that in the second embodiment, it is possible to obtain the same effects as those in the second embodiment described above.

However, the defroster interior structure 1C according to the present embodiment is disposed at both ends of the instrument panel 4 in the vehicle width direction so as to protrude upward from the instrument panel 4, is provided with the digital mirror monitor 5 that is inclined outward in the vehicle width direction and toward the rear of the vehicle, and is configured such that the bulging portion 42 in the second embodiment described above is replaced with the digital mirror monitor 5. Thus, when this configuration is adopted, there is no need to form the bulging portion 42 in the instrument panel 4, and thus aesthetic appearance is improved.

In the defroster interior structure 1C according to the present embodiment, an interior member includes the digital mirror monitor 5, and thus it is possible to prevent an airflow (air E) blown out from a defroster outlet 10 from flowing to an occupant side while hitting the entire surface of a side glass 2 while disposing the digital mirror monitor 5 at an easy-to-see position above the instrument panel 4. For this reason, when this configuration is adopted, it is possible to improve defrost performance while maintaining visibility for the occupant and to reduce the occupant's discomfort.

In the defroster interior structure 1C according to the present embodiment, at least a portion of the gap S extends more toward the front of the vehicle than the digital mirror monitor 5. For this reason, an airflow leaking out of the gap S toward the front of the vehicle from the digital mirror monitor 5 can be directed toward a window on a back surface 5b of the digital mirror monitor 5. Thus, when this configuration is adopted, an airflow is more likely to be directed toward the window, and the airflow can be prevented from being blown toward an occupant, thereby making it possible to reduce the occupant's discomfort.

The present invention is not limited to the above-described embodiments, and various design changes can be made without departing from the gist thereof.

For example, the embodiments described above adopt a configuration in which the side surface 4a of the instrument panel 4 and the inner side surface 3a of the door panel 3 are formed in a substantially planar shape, and the gap S is formed between the side surface 4a and the door panel 3. However, a configuration may be adopted in which at least one of the instrument panel 4 and the door panel 3 may have a concave shape curved away from the other, and a gap is formed between the concave shape and the other.

In this case, since the gap is formed in a concave shape, a gap between the side surface of the instrument panel and the door panel can be made smaller than in a case where the gap is formed uniformly, thereby improving aesthetic appearance. In this case, since the gap is formed in a concave shape, an airflow blown out from the defroster outlet can be given directionality, and the airflow can be reliably blown to a desired position on the side glass. Thus, when this configuration is adopted, anti-fogging performance of the side glass can be further improved.

The above-described embodiments adopt a configuration in which a portion of the defroster outlet 10 is disposed closer to the front of the vehicle than the vehicle front end 2a of the side glass 2, and an airflow is blown out toward the vehicle front end 2a, but are not limited thereto. For example, the entire defroster outlet 10 may be disposed closer to the front of the vehicle than the vehicle front end 2a of the side glass 2, or may be disposed closer to the rear of the vehicle than the vehicle front end 2a of the side glass 2.

The above-described embodiments adopt a configuration in which the upper end 3c of the door panel 3 includes the curved portion 31 that is curved toward the side glass 2 from the gap S, but the upper end 3c of the door panel 3 is not limited to being the curved portion 31.

As a bulging portion of the instrument panel 4, the bulging portion 42 formed at the upper end of the side surface 4a of the instrument panel 4 is adopted in the second embodiment, and the digital mirror monitor 5 provided on the upper surface 4b of the instrument panel 4 is adopted in the third embodiment, but the present invention is not limited thereto. The digital mirror monitor 5 is an example of an interior member, and other interior members may also be used.

What is claimed is:

1. A defroster interior structure comprising:
   a defroster outlet blowing out air toward a side glass provided on a door of a vehicle,
   wherein the door includes the side glass and a door panel provided below the side glass,
   the defroster outlet is disposed at a position where a side surface of an instrument panel and the door panel overlap each other in a vehicle width direction, and
   the side surface and the door panel form a gap through which an airflow blown out from the defroster outlet flows toward the side glass.

2. The defroster interior structure according to claim 1, wherein at least one of the instrument panel and the door panel has a concave shape that is curved away from the other, and a gap is formed between the concave shape and the other.

3. The defroster interior structure according to claim 1, wherein the defroster outlet is disposed closer to a front of a vehicle than a vehicle front end of the side glass and blows out an airflow toward the vehicle front end.

4. The defroster interior structure according to claim 1, wherein an upper end of the door panel includes a curved portion that is curved toward the side glass from the gap.

5. The defroster interior structure according to claim 1, wherein the side surface of the instrument panel includes an upper-lower surface extending upward from the defroster outlet, and a bulging portion that bulges outward in the vehicle width direction from an upper end of the upper-lower surface.

6. The defroster interior structure according to claim 5, wherein interior members are provided at both ends of the instrument panel in the vehicle width direction, and the interior members being disposed to protrude above the instrument panel and to be inclined outward in the vehicle width direction and toward a rear of the vehicle, and the bulging portion is the interior member.

7. The defroster interior structure according to claim 6, wherein the interior member includes a digital mirror monitor.

8. The defroster interior structure according to claim 6, wherein at least a portion of the gap extends further forward in the vehicle than the interior member.

\* \* \* \* \*